A. REICHERT.
POTATO PLANTER.
APPLICATION FILED APR. 17, 1914.
1,178,263.
Patented Apr. 4, 1916.
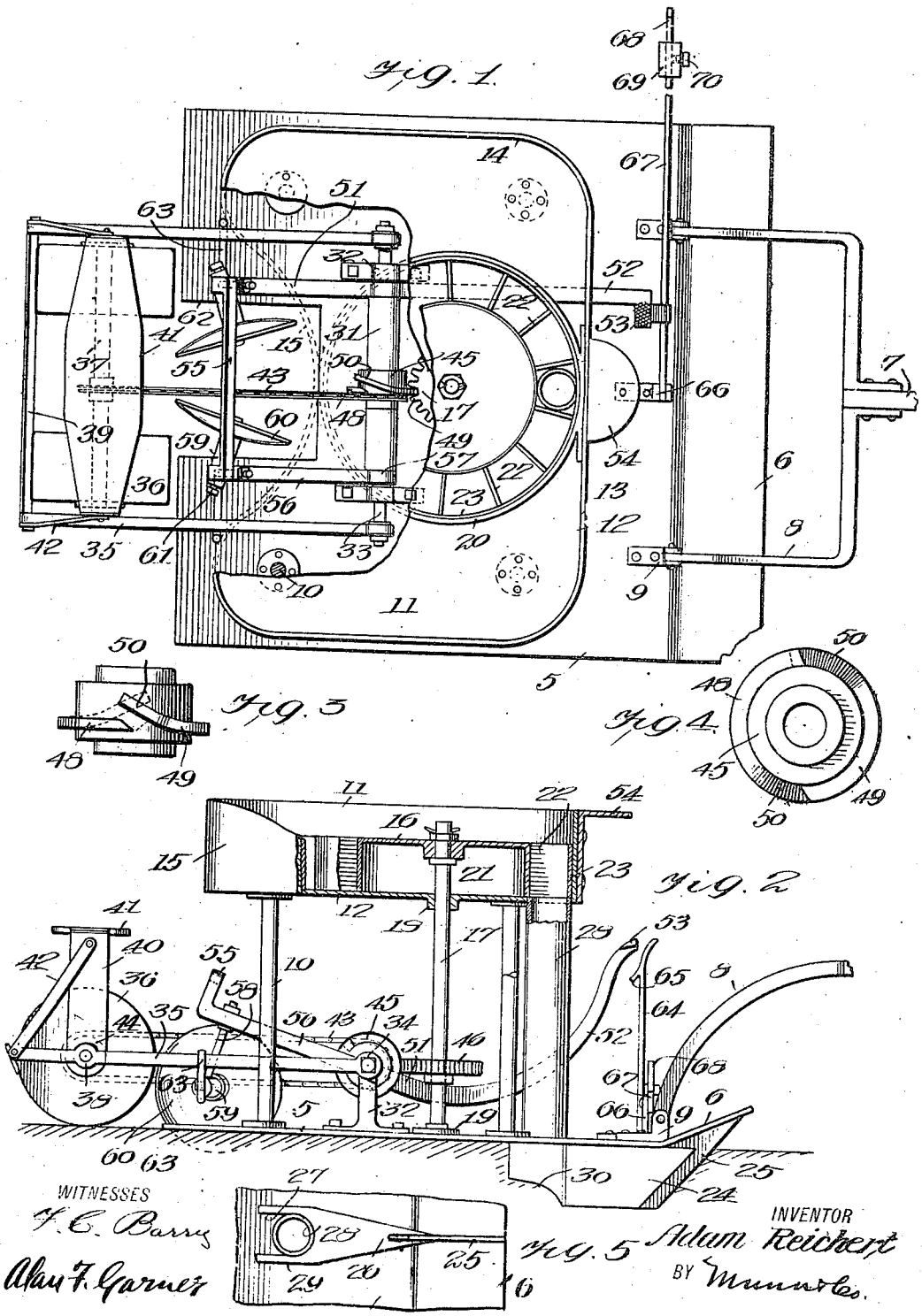
WITNESSES
INVENTOR
Adam Reichert
BY Munn & Co.
ATTORNEYS

UNITED STATES PATENT OFFICE.

ADAM REICHERT, OF AUBURN, WASHINGTON.

POTATO-PLANTER.

1,178,263.      Specification of Letters Patent.      Patented Apr. 4, 1916.

Application filed April 17, 1914. Serial No. 832,512.

*To all whom it may concern:*

Be it known that I, ADAM REICHERT, a citizen of the United States, and a resident of Auburn, in the county of King and State of Washington, have invented a new and useful Improvement in Potato-Planters, of which the following is a specification.

This invention relates to potato planters, and one of the principal objects of the invention is to provide a planter including a revoluble feeder wheel and mechanism for securely rotating or "kicking" the wheel at equal intervals whereby the potatoes carried by the wheel will be deposited at equally spaced intervals in a delivering tube or boot, irrespective of the size of the potatoes, so that they may be conveyed through the tube to the ground and uniformly planted at equal distances and depths apart.

Another object of the invention is to provide a planter including a substantially flat drag or float on which the feeding mechanism is supported and carrying a depending delivering shoe communicating with the delivering tube and adapted to form a channel or furrow in which potatoes may be deposited from the tube, the float serving the purpose of smoothing and flattening the ground on the sides of the planted rows.

A further object of the invention is to provide a planter of the class described, including a follow roller journaled in a lever actuable frame whereby the roller may be lifted clear of the ground when the drag is being turned or when occasion requires, the roller being geared with the feeder wheel operating mechanism, for operating the latter.

A still further object of the invention is to provide a planter of the class described, including means for forming a channel, means for depositing the potatoes at equally spaced intervals, and at uniform depths in the channel, irrespective of the size of the potatoes, means for covering the deposited potatoes, means for rolling the ground alongside of the planted rows, and means for lifting the covering and rolling means clear of the ground at will.

With these and other objects in view, which will become apparent as the description proceeds, the invention resides in the construction, combination and arrangement of parts hereinafter more fully described and claimed, and illustrated in the accompanying drawing in which like characters of reference indicate like parts throughout the several figures, of which—

Figure 1 represents a top plan view of the planter, portions being broken away for clearness of illustration. Fig. 2 represents a side elevational view of the planter shown partly in section, Fig. 3 represents a plan view of the double cam gear, Fig. 4 represents an end view thereof, and Fig. 5 represents an inverted plan view of a portion of the float showing the planting shoe thereon.

Referring more particularly to the drawing, 5 indicates the float or drag, which is preferably formed of a flat substantially rectangular metal plate, the front end of the float being upturned at an angle as at 6. A shaft 7 is connected by means of bows 8 with the float, said bows being secured to the shaft at their upper ends and at their inner ends pivoted in brackets 9 carried by the float, so that the float may be drawn by suitable draft animals.

Secured to the float and extending upwardly therefrom are a number of uprights or posts 10 which support a receiver 11, the latter including a bottom 12, a front wall 13, side walls 14, and a rear wall 15, which latter is bowed inwardly toward the front wall throughout most of its length, and a feeder wheel 16 is carried by the receiver, and is keyed or otherwise secured to a vertically disposed shaft 17, extending through a bearing 18 in the floor of the receiver, being journaled at its lower end in a socket 19 carried by the float, said feeder wheel adapted to rotate with shaft 17 and being inclosed by a circular casing 20, carried by the receiver. The receiver is adapted to have potatoes deposited therein, and the walls and bottom of the receiver coact with the walls of casing 20 for forming receptacles in which the potatoes may be dumped, the receiver walls being higher than those of the casing except the rear wall 15 which, as shown in Fig. 2, is tapered downwardly so as to lie flush at its central portion with the upper edge of the casing. The feeder wheel includes a hub or drum 21 provided with a plurality of spaced radially disposed blades 22 connected at their outer ends by a rim 23.

Disposed in the medial line of the float and depending therefrom at its forward portion, is a delivering shoe 24 comprising a forward cutting blade 25 and a substantially V-shaped body portion 26, whose sides converge toward the blade 25, as shown clearly in Fig. 5, the rear portion of body 26 being recessed as at 27, and communicating with the recess is the lower end of a delivering tube or boot 28 which is vertically disposed and which extends through the float 5 and through the floor 12 of the receiver at the forward portion of said floor, and in the path of rotation of the blades 22 of the feeder wheel, so that as the blades rotate they pass above the upper open end of the tube. The forward side walls of the delivering shoe converge as stated, but the rear side walls are parallel to each other as at 29, and are cut-away at their lower rear edges as indicated at 30, and the purpose of the shoe is to form a channel or furrow in the ground as the float is drawn thereover, said furrow being of a uniform width and depth. The shoe does not turn the earth but merely acts as a wedge so as to force any clods or stones lying in its path to one side, as the channel is made so that the latter will be straight, and as stated, of uniform width and depth.

Disposed rearwardly of the wheel shaft 17, is a horizontal cam gear shaft 31, which extends transversely of the float, and is journaled in upwardly extending brackets 32, and on the reduced ends 33 of the shaft 31 outside of brackets 32, are pivoted as at 32, the forward ends of the side bars 35 of a roller frame, between which bars near their rear ends is disposed a pair of spaced rollers 36 keyed upon a shaft 37 which at its ends is journaled in bearing 38 formed on the bars 35 of the roller frame. The rollers are disposed one on each side of the central longitudinal line of the float, and are spaced a distance apart somewhat greater than the width of the channel formed by the delivering shoe, and said rollers are disposed immediately to the rear of the float. A scraper 39 is carried by the roller frame and is adapted to prevent the accumulation of dirt upon the roller surfaces. A yoke 40 forming a seat 41 is supported by the roller frame and is braced thereto as at 42, said seat being disposed immediately above the rollers, and is adapted to carry an operator who deposits the potatoes from the receiver into the feeder wheel during the operation of planting.

The shaft 31 is driven by means of a chain 43 which runs over a sprocket wheel carried by said shaft and over a second sprocket wheel 44 carried by the roller shaft 37, so that as the rollers rotate, the shaft 31 is driven. Keyed to shaft 31 centrally thereof and immediately in the rear of the wheel shaft 17, is a double cam gear 45 which is in substantially the shape of a worm gear, and which meshes with a horizontally disposed pinion 46, keyed on shaft 17 whereby the latter, and consequently the feeder wheel, are rotated.

The double cam gear is provided with two threads 48 and 49, each of which extends substantially half way around the circumference of the gear, one beginning where the other leaves off, and the threads for the most of their length are in alinement with each other transversely of the gear and are straight, being disposed in a plane arranged at right angles to the axis of the gear, what may be termed the rear portions of each thread, however, being sharply offset at an obtuse angle, as indicated at 50, so as to provide a pair of cam surfaces which, by contacting with the teeth of the pinion 46 as the cam gear rotates, quickly turns the shaft 17 and consequently the feeder wheel for a distance equal to the distance between the blades 22, so that a succession of quick throws or "kicks" are imparted at intervals to the feeder wheel and hence the potatoes which are deposited by the operator in the spaces between the blades 22, whether the potatoes be large or small, are brought quickly and suddenly into alinement with tube 28, as the wheel is intermittently rotated, so that the potatoes are dropped down the tube and deposited in the channel at equal distances apart.

It will be understood from Fig. 3 that each cam portion 50 terminates at the beginning of the straight portion of the succeeding thread, so that immediately upon one cam portion leaving the pinion 46, the straight portion of the succeeding thread will have engaged it so as to direct the succeeding cam into engagement with the teeth of the wheel. The cams 50 are disposed on the same side of the plane of the threads, so that, as will be readily understood, the feeder wheel will be rotated in a single direction.

By this construction each cell or space between the blades 22 is successively brought into alinement with the delivering tube, and hence the movement of the wheels constitutes substantially a succession of intermittent kicks, as will be understood, and whether large or small potatoes are deposited in the cells, they will be dropped into the delivering tube at exactly equal intervals of time apart, and hence the potatoes will be dropped into the channel at equal distances apart and will remain at the point within the channel where they are deposited and will be placed at a uniform depth below the surface of the ground.

Pivoted mid-way of its length on a reduced portion of shaft 31 adjacent one of the bearings 32, is a lever arm 51 which extends forwardly under the receiver and is then bent upwardly as at 52 and is provided with a pedal 53, whereby it may be actuated from a driver's seat 54 secured to the forward portion of the receiver, said arm at its rear end being rigidly connected by a bow 55 with a second arm 56 extending from the opposite end of bow 55 in parallel and spaced relation with arm 51 to the shaft 31 upon a reduced portion of which it is pivoted as at 57. Lever 51, bow 55 and arm 56 form a rigid frame which may be rocked upon shaft 31 when actuated by the driver.

Extending downwardly and rearwardly from each arm 51 and 56 is a bar 58 extending through an opening in a stub-axle or spindle 59 on the inner end of which is carried a covering disk 60, said spindles 59 being adjustable, vertically and rotatably upon the bars 58, and adapted to be secured in adjusted position by means of set screws 61 threaded into the outer ends of the spindles and adapted to be engaged against the bars 58 for maintaining the spindles and consequently the covering disks in any adjusted position.

The rear portion of float 5 is provided with a centrally disposed recess 62, through which the edges of the covering disks extend so that the channel may be filled in to cover the potatoes after they have been deposited in the channel.

The disks 60 are arranged in spaced relation one on each side of the medial line of the float upon which line the delivery shoe is disposed, so that as will be understood, the channel formed will be covered from each side, and the rollers 36 are disposed immediately to the rear of the covering disks, so that the earth on each side of the channel will be rolled, but the rollers are spaced far enough apart so that the earth immediately covering the potatoes will not be compressed, and hence since the earth is left in a pulverized and substantially loose state, the conditions for their sprouting and subsequent growth will be ideal.

The lower ends of the rods 58, are extended outwardly, and then upwardly to form hooks 63, in vertical alinement with the side bars 35, of the roller frame, so that when the forward end of lever 51 is depressed by the driver, the rear end of the lever arm, and the arm 46, and consequently bars 58 will be raised, thus raising the covering disks out of contact with the ground and by reason of the hooks engaging the roller frame the latter together with the rollers will be raised out of engagement with the ground. Ordinarily the disks and rollers will of course be in engagement with the ground to perform their various functions, but when the end of a row is reached they will be elevated in the manner described, so that the planter may be turned about to start on a new row, and it has been found that in thus turning, the planter shoe serves as a pivot upon which the planter rotates, the operation of turning thus being very easily accomplished. A vertically disposed resilient latch bar 64 is secured near the forward edge of the float, and is provided with a tooth 65 in alinement with pedal 53, so that when the latter is depressed, said tooth engages over the pedal as will be readily understood, to maintain the disks and rollers in raised position, the driver pushing the upper end of the latch bar forwardly with his foot, when the disks are to be lowered, thus disengaging the tooth from the pedal and allowing the rear frames to drop. Swiveled at its inner end in a vertical bracket 66 disposed midway between the side edges of the float just rearwardly of the line of brackets 9, is a bar 67 provided at its outer end with a marker 68, for marking the rows as a field is being planted, said bar adapted when the float reaches the end of the row, and is turned about, to be thrown across to the other side of the float, so as to mark the next succeeding row, as will be understood. A sliding weight 69 is provided on the bar and carries a set screw 70 whereby it may be maintained in any position longitudinally of said bar, so that the marker may be properly weighted under any condition of the soil.

Although I have described the preferred embodiment of my invention, I may desire to make such changes in the construction, combination and arrangement of parts as do not depart from the spirit of the invention and the scope of the appended claims.

I claim:

1. A planter comprising a float, a shaft carried by the float, a frame pivoted on said shaft, a roller shaft journaled in the frame rearwardly of the float, a pair of spaced rollers keyed on said roller shaft, a second frame pivoted on said shaft within the roller frame, said second frame having a bar extending forwardly to form a lever arm, covering disks carried by the second frame in spaced relation, said disks extending within a recess cut in the float, hooks carried by the second frame and adapted when the latter is raised to engage the roller frame for raising the latter, said lever adapted when lowered to raise said second frame, and a seed mechanism operable by the rollers.

2. A potato planter including a float comprising a substantially rectangular flat sheet of suitable material, having its forward edge upturned, a draft tongue connected to said float, planter mechanism carried by the float, means carried by the float for forming a channel in the earth, means for actuating the planter mechanism whereby to deposit potatoes within the channel, means for covering the potatoes, and means for rolling the earth on each side of the channel.

3. A planter including a substantially flat sheet of material, channel forming means carried thereby, a pair of frames pivotally connected to the sheet, channel filling means carried by one of the frames and earth rolling means carried by the other, means whereby the frames may be elevated at will, a feeder means carried by the sheet and adapted to dispose seed within the channel, and means operable by the roller means for driving the feeder means.

4. A planter including a float, means for forming a channel in the earth, feeding mechanism for depositing potatoes at spaced intervals within said channel, a pair of frames concentrically pivoted above said float, covering disks carried by one of said frames, rollers carried by the other frame, connecting means between said frames whereby one of the frames is elevated upon the elevation of the other frame, and means for elevating one of the said frames at will.

5. A planter including a drag in the form of a substantially flat body, a feeding mechanism mounted thereon, means associated with the drag for forming a channel in the earth, said feeding mechanism adapted to deposit seed within the channel, a frame carried covering mechanism pivotally supported by the drag, a frame carried rolling mechanism pivotally carried by the drag, coacting means between the covering mechanism and the rolling mechanism whereby the latter will be elevated upon elevation of the former, means for elevating the covering means at will, and means operable by the rolling mechanism for driving the feeding mechanism.

6. A planter including a flat drag, a feeder mechanism carried thereby and adapted to deposit seed in the earth at spaced intervals, a roller mechanism pivotally connected with the drag, and adapted to be raised and lowered, means operable by the roller mechanism for driving the feeder mechanism, and covering means movably connected with the drag and adapted to be raised and lowered at will, and coacting means between the roller mechanism and covering means for raising the former upon elevation of the latter.

ADAM REICHERT.

Witnesses:
ALAN F. GARNER,
SOLON C. KEMON.

Copies of this patent may be obtained for five cents each, by addressing the "Commissioner of Patents, Washington, D. C."